US012646947B2

(12) United States Patent
Park et al.

(10) Patent No.: US 12,646,947 B2
(45) Date of Patent: Jun. 2, 2026

(54) POWER CONVERSION DEVICE HAVING MULTI-LEVEL STRUCTURE

(71) Applicant: LG INNOTEK CO., LTD., Seoul (KR)

(72) Inventors: Jeong Heum Park, Seoul (KR); Kwang Soon Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 191 days.

(21) Appl. No.: 18/574,140

(22) PCT Filed: Jul. 1, 2022

(86) PCT No.: PCT/KR2022/009535
§ 371 (c)(1),
(2) Date: Dec. 26, 2023

(87) PCT Pub. No.: WO2023/277653
PCT Pub. Date: Jan. 5, 2023

(65) Prior Publication Data
US 2024/0243583 A1 Jul. 18, 2024

(30) Foreign Application Priority Data
Jul. 1, 2021 (KR) ........................ 10-2021-0086740

(51) Int. Cl.
*H02M 3/158* (2006.01)
*H02J 3/38* (2006.01)
(Continued)

(52) U.S. Cl.
CPC ........... *H02J 3/381* (2013.01); *H02M 1/0067* (2021.05); *H02M 3/158* (2013.01); *H02J 2101/25* (2026.01)

(58) Field of Classification Search
CPC ............. H02M 1/0077; H02M 1/0067; H02M 1/0074; H02M 1/008; H02M 1/009;
(Continued)

(56) References Cited

U.S. PATENT DOCUMENTS 9,013,061 B2 * 4/2015 Siri ......................... G06F 1/263
307/46
2016/0072396 A1 3/2016 Deboy et al.
(Continued)

FOREIGN PATENT DOCUMENTS

JP 09-327127 12/1997
JP 2004-215439 7/2004
(Continued)

OTHER PUBLICATIONS

Korean Office Action dated Aug. 18, 2025 issued in Application No. 10-2021-0086740.
(Continued)

*Primary Examiner* — Nguyen Tran
(74) *Attorney, Agent, or Firm* — KED & ASSOCIATES, LLP

(57) ABSTRACT

A power conversion device according to one embodiment of the present invention comprises: a plurality of converters comprising at least one upper switch and at least one lower switch, and respectively connected to a plurality of cell strings; and an auxiliary power supply unit for supplying driving power to each of the plurality of converters, wherein the auxiliary power supply unit comprises: a primary-side circuit for receiving the voltage of at least one output terminal from among output terminals of the plurality of cell strings; an insulation type converter for outputting voltage to first secondary-side circuits in accordance with the voltage of the primary-side circuit; and the plurality of first secondary-side circuits for supplying the driving power to each of the upper switch of the plurality of converters by using the voltage output from the insulation type converter, wherein the plurality of converters have a multi-level structure.

20 Claims, 11 Drawing Sheets

(51) Int. Cl.
    *H02M 1/00*       (2006.01)
    *H02J 101/24*     (2026.01)

(58) Field of Classification Search
    CPC .... H02M 1/007; H02M 3/158; H02M 3/1584;
                H02M 3/1586; H02M 3/156; H02M
        3/157; H02M 3/155; H02M 3/1557; H02J
              1/00; H02J 1/08; H02J 1/082; H02J
            1/084; H02J 1/10; H02J 1/106; H02S
         40/30; H02S 40/32; H02S 40/36; H02S
                                    40/38
    See application file for complete search history.

(56)                 References Cited

U.S. PATENT DOCUMENTS

| | | | |
|---|---|---|---|
| 2018/0309374 A1 | 10/2018 | Koo et al. | |
| 2021/0351592 A1* | 11/2021 | Gu .......................... | H02J 3/381 |
| 2022/0001750 A1* | 1/2022 | Zushi ........................ | H02J 7/35 |

FOREIGN PATENT DOCUMENTS

| | | |
|---|---|---|
| JP | 2007-259614 | 10/2007 |
| JP | 2008-245458 | 10/2008 |
| WO | WO 2013/014879 | 1/2013 |

OTHER PUBLICATIONS

International Search Report dated Oct. 20, 2022 issued in Application No. PCT/KR2022/009535.

* cited by examiner

【FIG. 1】
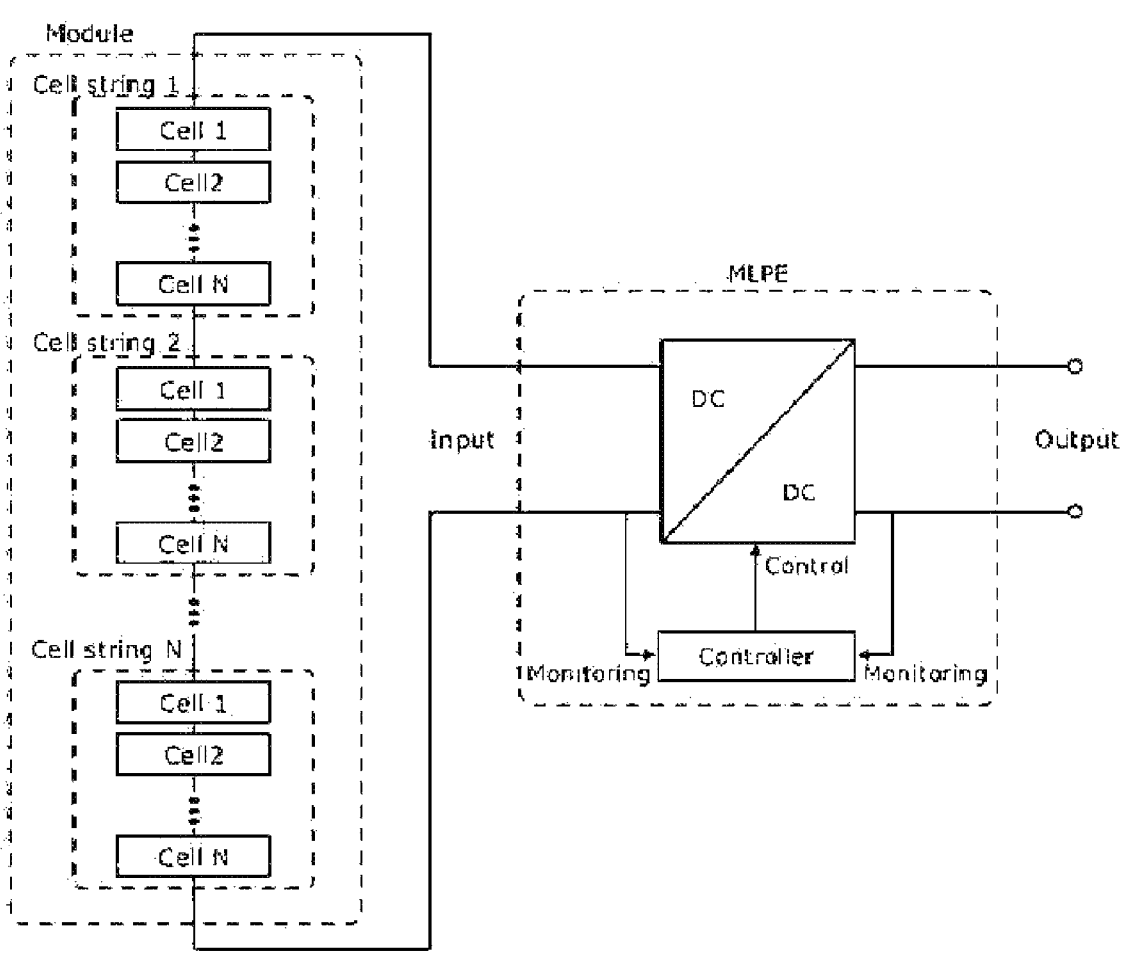

【FIG. 2】
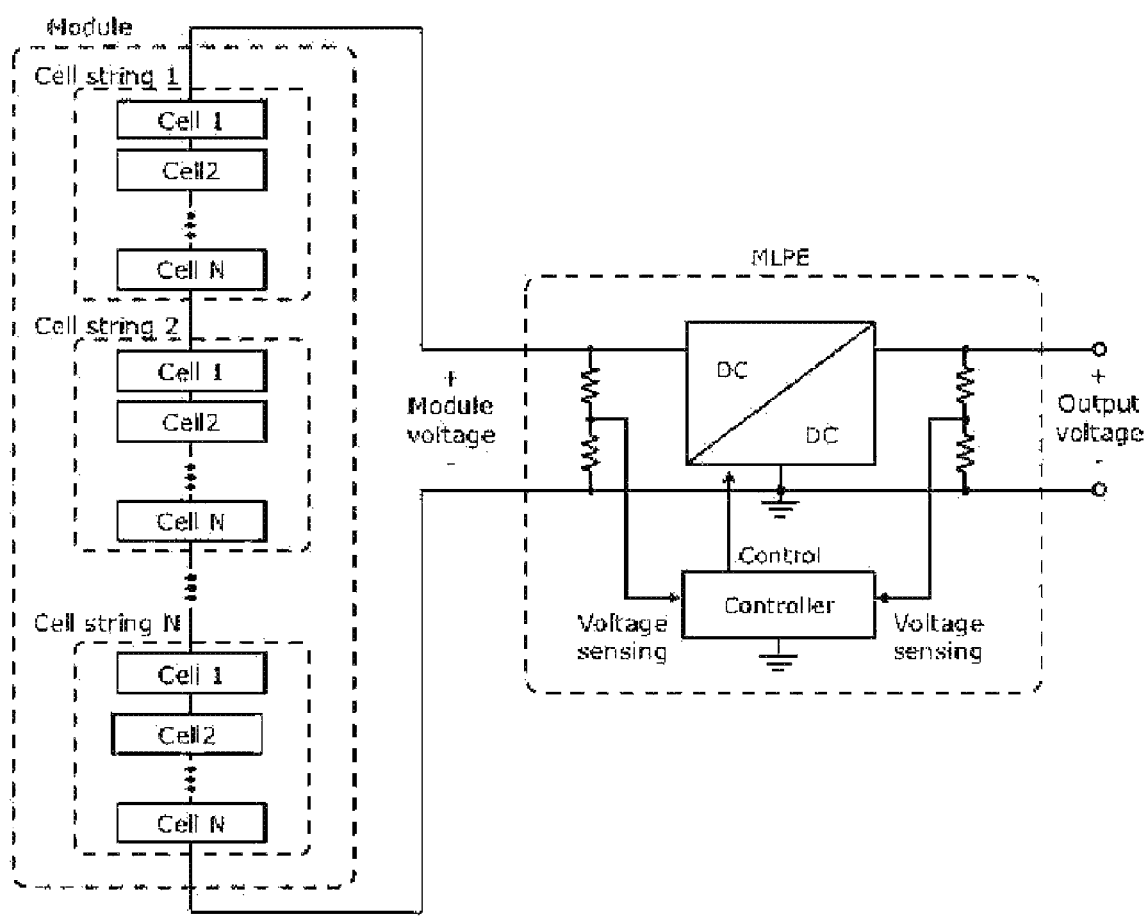

【FIG. 3】
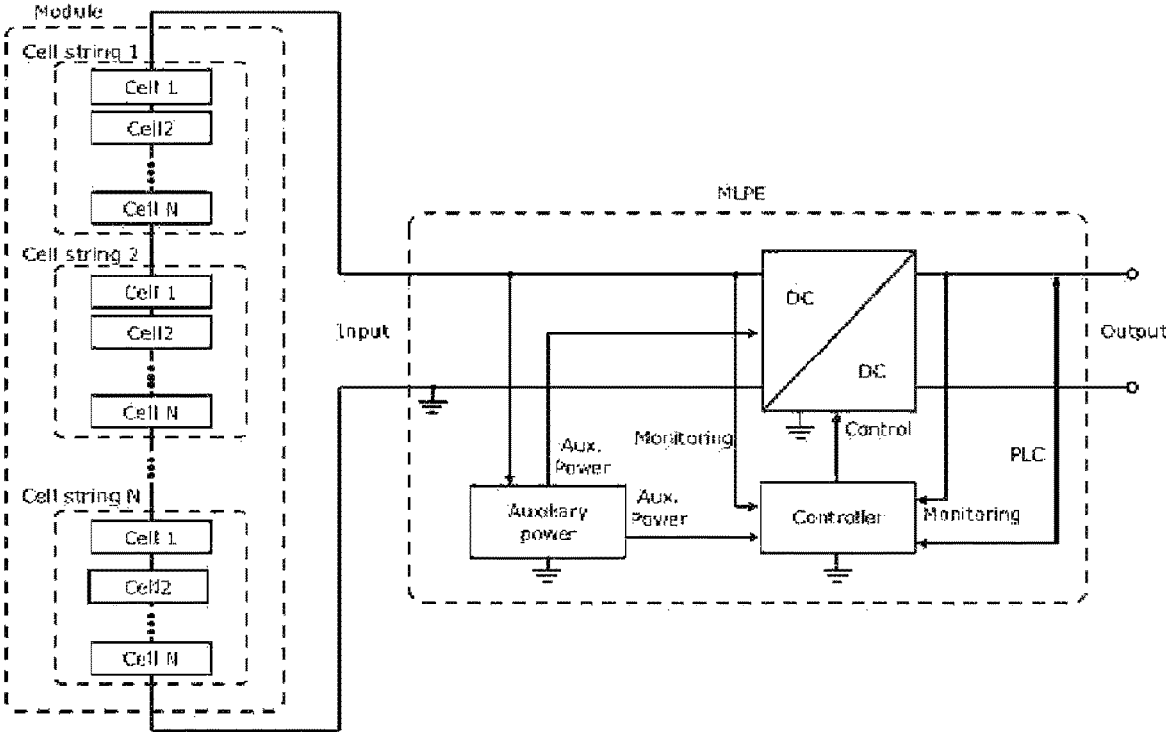
【FIG. 4】
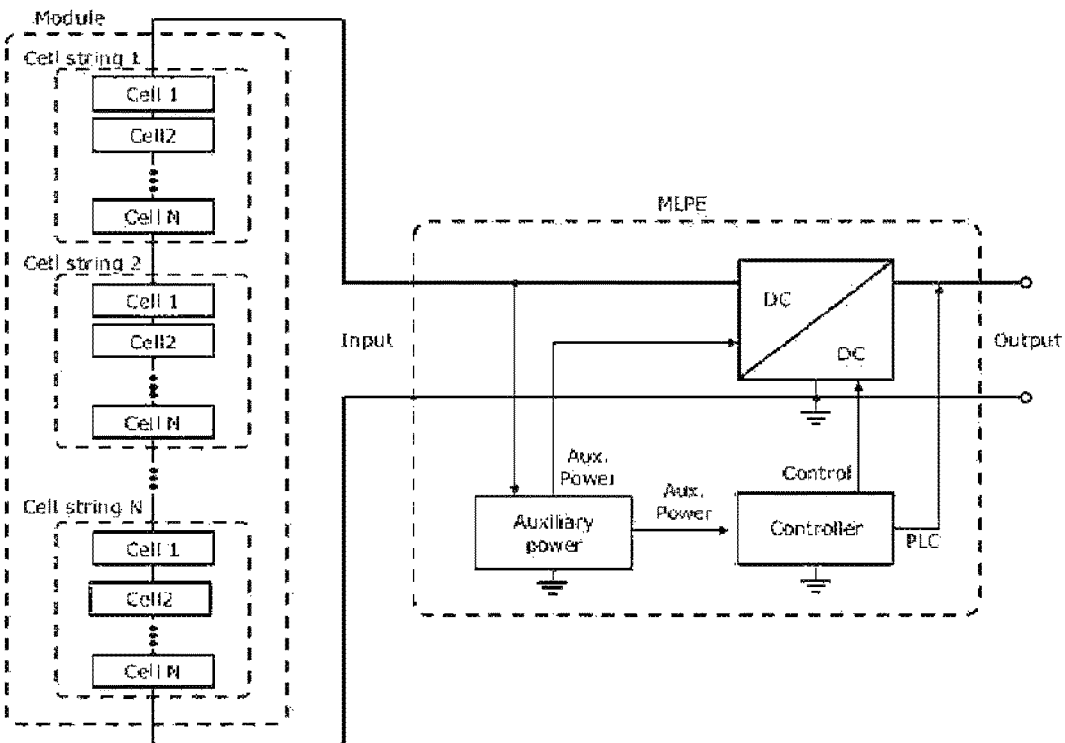

【FIG. 5】
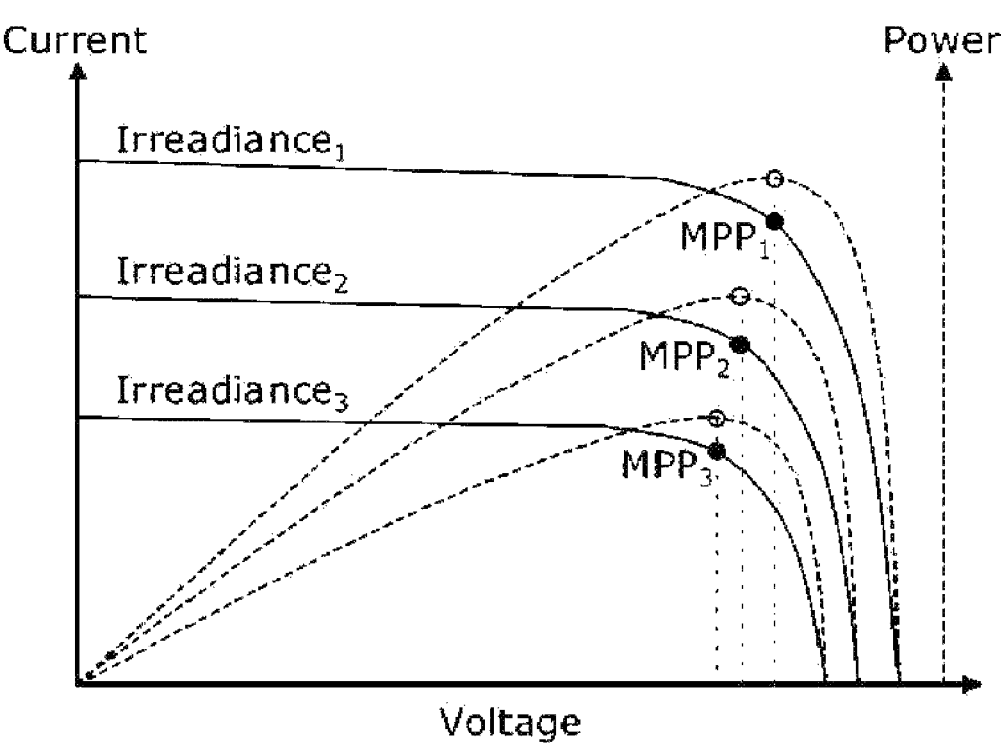

【FIG. 6】
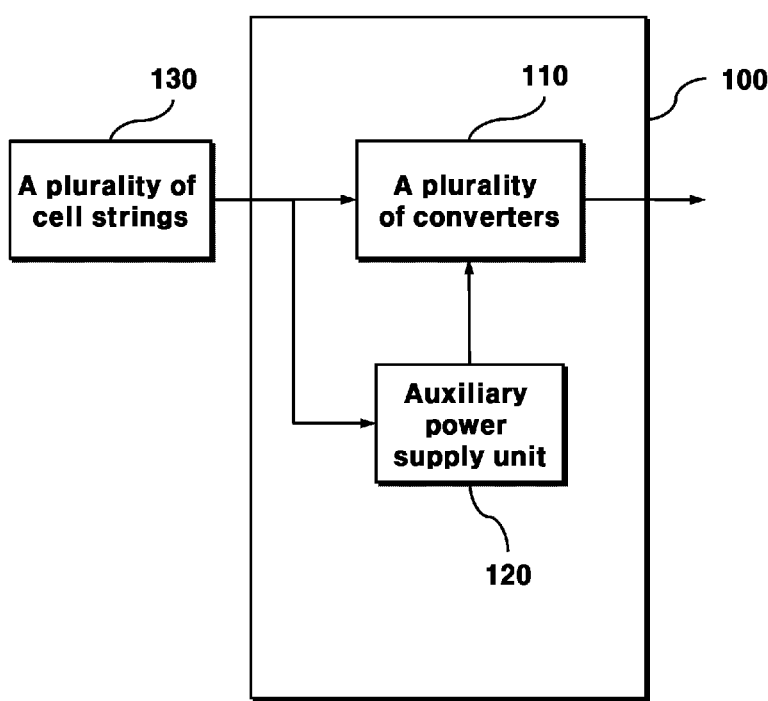

【FIG. 7】
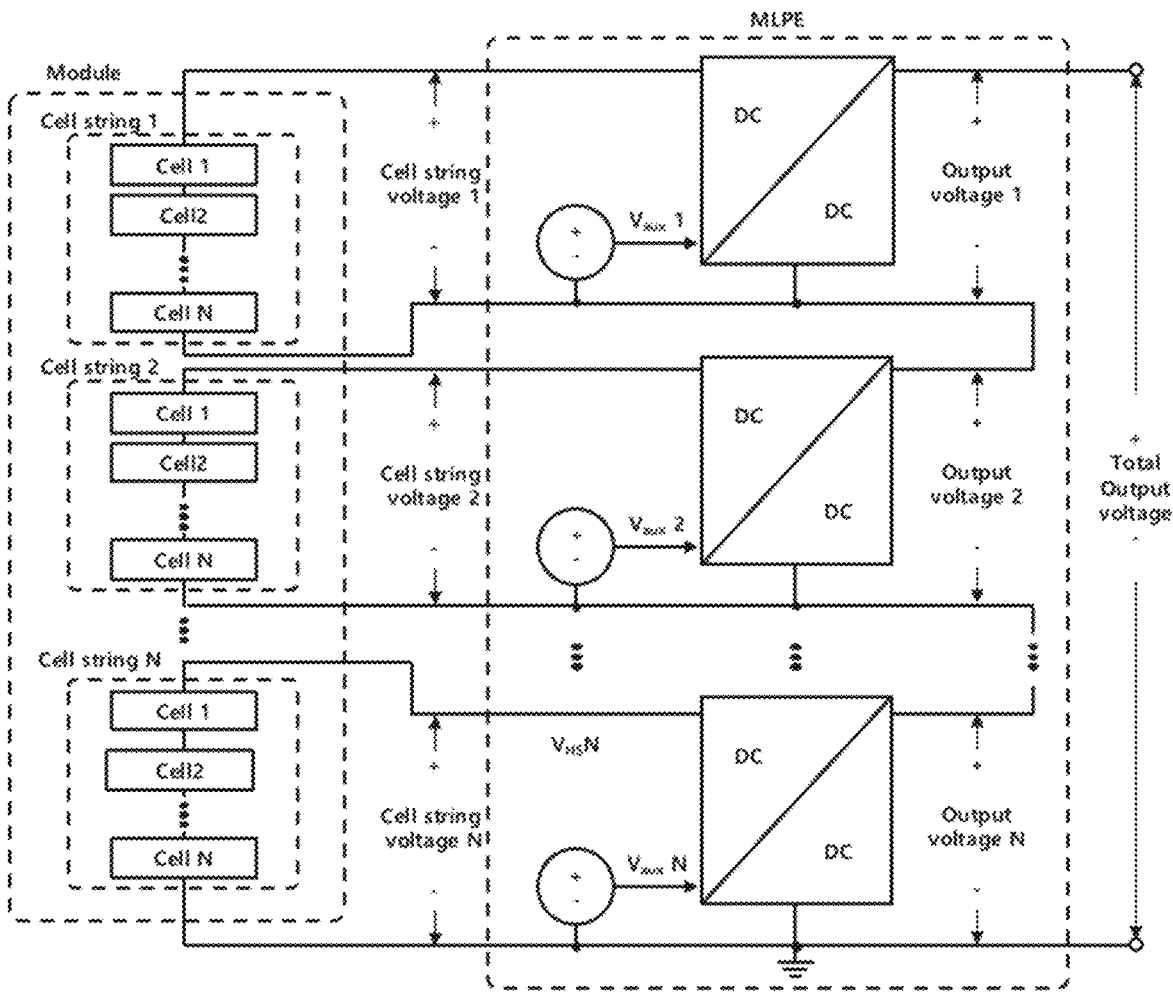

【FIG. 8】
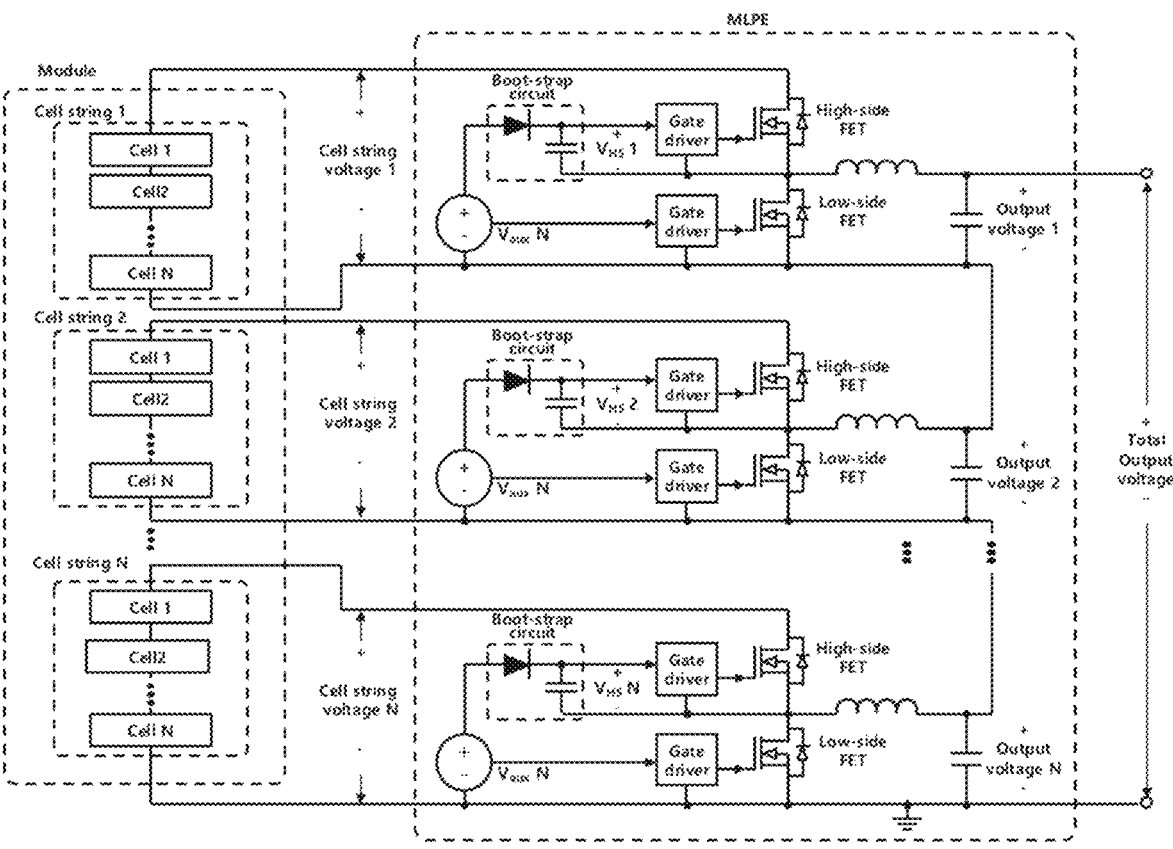

【FIG. 9】
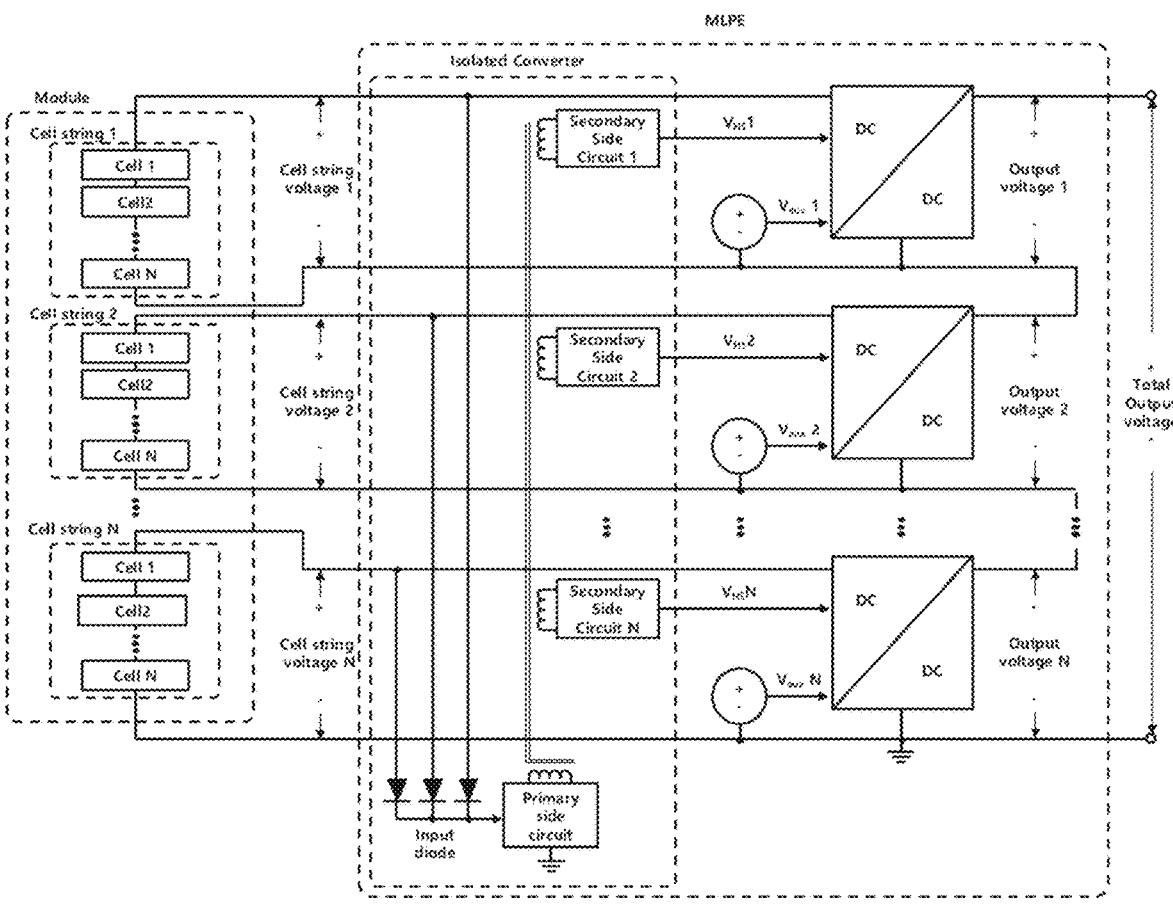

【FIG. 10】
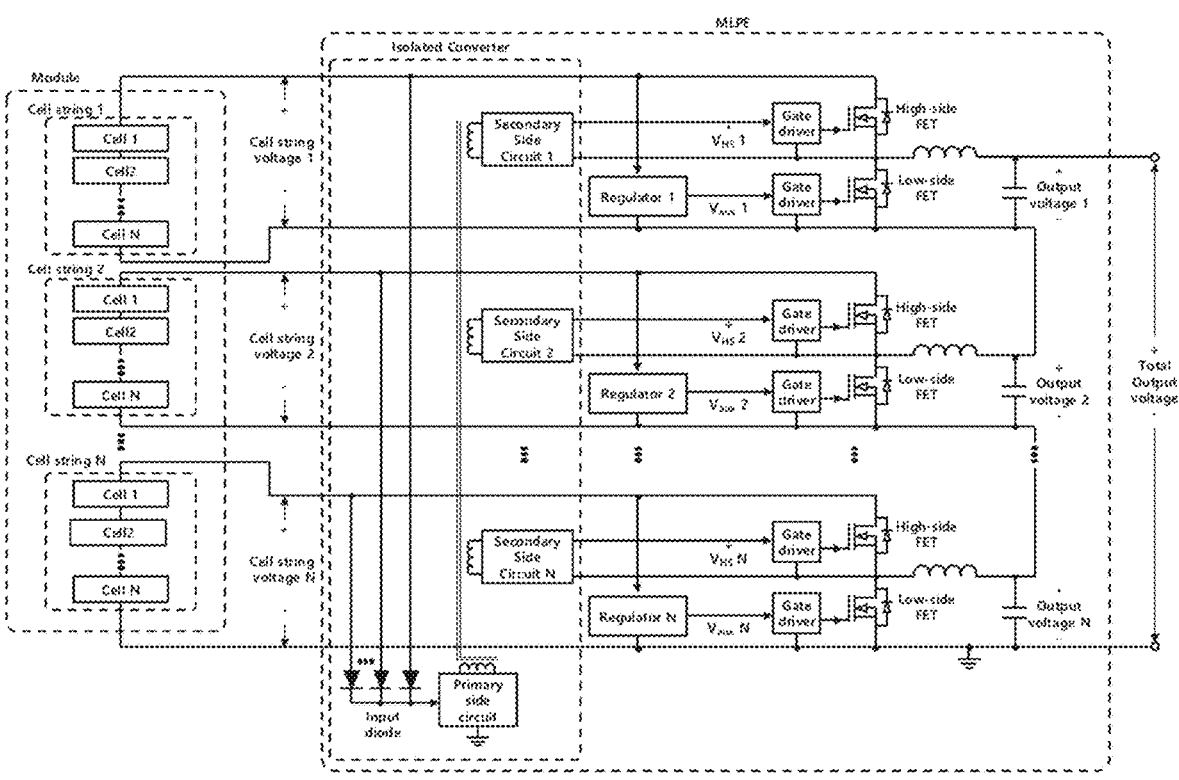

【FIG. 11】
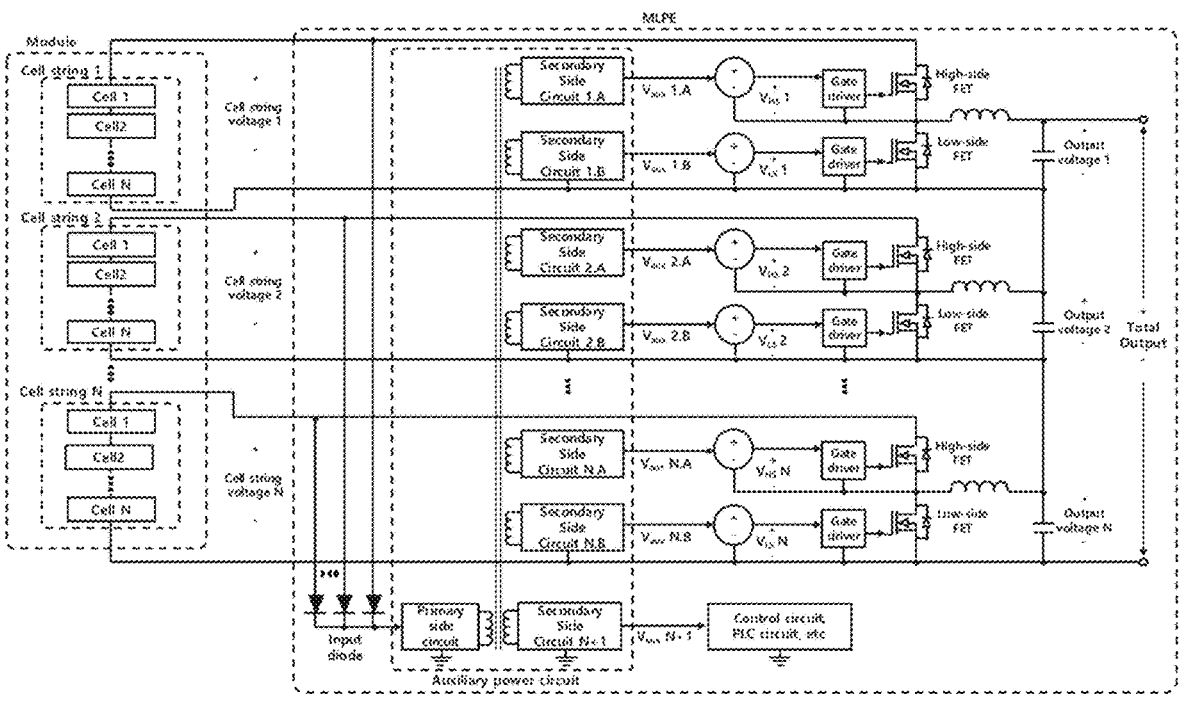

【FIG. 12】
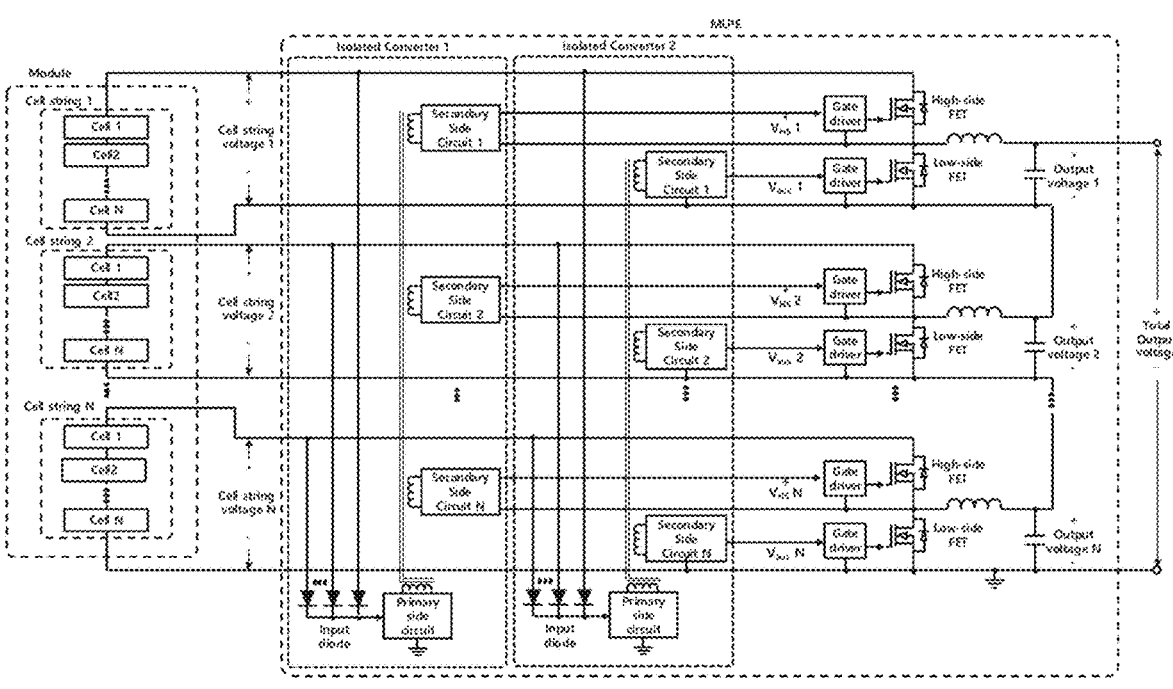

POWER CONVERSION DEVICE HAVING MULTI-LEVEL STRUCTURE

CROSS-REFERENCE TO RELATED PATENT APPLICATIONS

This application is a U.S. National Stage Application under 35 U.S.C. § 371 of PCT Application No. PCT/KR2022/009535, filed Jul. 1, 2022, which claims priority to Korean Patent Application No. 10-2021-0086740, filed Jul. 1, 2021, whose entire disclosures are hereby incorporated by reference.

TECHNICAL FIELD

The teachings in accordance with exemplary and non-limiting embodiments of this invention relate to a power conversion device, and more particularly to a power conversion device utilizing a plurality of converters having a multi-level structure.

BACKGROUND ART

Photovoltaic power generation is an eco-friendly energy generation method that has been widely used to replace conventional chemical and nuclear power generation. In general, stand-alone power generation consists of solar cells, storage batteries, and power conversion devices, while grid-connected systems are connected to commercial power sources so that power can be exchanged with the load grid.

Solar cell modules have different maximum power points depending on sunlight, temperature, etc. To operate photo-voltaic cells at their maximum power point, module-level power electronics (MLPE) with maximum power point tracking (MPPT) control on a module-by-module basis can be used. However, MLPE with a single converter makes it difficult to achieve optimized MPPT control when each cell in the module has different sunlight, temperature, ETC.

As shown in FIG. 1, in a single converter application method, all cells are connected in series and fed into the MLPE, which performs maximum power point tracking control for the entire solar cell module. In this case, the problem is that the maximum power point of each cell string is different due to the different amount of sunlight in the cell string, and the maximum power point tracking control for individual strings is not possible.

In addition, in the MLPE with single converter application method, the solar cell module, DC/DC converter, and controller are designed with the same electric potential, as shown in FIG. 2. As a result, the voltage detection circuit can be implemented with only a resistor distribution circuit for the controller to detect the PV cell module voltage and the DC/DC converter output voltage. However, the above method cannot be applied to MLPE with a multi-level structure.

In addition, in the MLPE with a single converter application method, the solar cell module, DC/DC converter, controller, and auxiliary power source all use the same ground. As a result, it is possible to configure an auxiliary power supply circuit to receive power from the photovoltaic cell module and provide auxiliary power to the converter and controller, as shown in FIGS. 3 and 4. However, the above method cannot be applied to MLPEs with a multi-level structure.

DETAILED DESCRIPTION

Technical Subject

The technical subject that the present invention seeks to solve is to provide a power conversion device that utilizes a plurality of converters with a multi-level structure.

Technical Solution

In order to solve the abovementioned technical subject, a power conversion device according to an exemplary embodiment of the present invention may comprise: a plurality of converters comprising at least one upper switch and at least one lower switch, and respectively connected to a plurality of cell strings; and an auxiliary power supply unit for supplying driving power to each of the plurality of converters, wherein the auxiliary power supply unit comprises: a primary-side circuit for receiving the voltage of at least one output terminal from among output terminals of the plurality of cell strings; an insulation type converter for outputting voltage to first secondary-side circuits in accordance with the voltage of the primary-side circuit; and the plurality of first secondary-side circuits for supplying the driving power to each of the upper switch of the plurality of converters by using the voltage outputted from the insulation type converter, wherein the plurality of converters has a multi-level structure.

Further, each of the first secondary-side circuits may be connected to an upper gate driver supplying a gate signal to the upper switch and to a terminal between the upper switch and the lower switch.

Further, the power conversion device may include a plurality of individual auxiliary power supplies that each provide a drive (driving) power to respective lower switches of the plurality of converters.

Further, the individual auxiliary power supply unit may comprise a regulator connected between each input end of the plurality of converters, the regulator being connected between the (−) terminals of the input end and a lower gate driver supplying a gate signal to the lower switch.

Further, the power conversion device may comprise a plurality of second secondary-side circuits for supplying a drive power to each of the lower switches of the plurality of converters using a voltage outputted from the insulation type converter, the insulation type converter being capable of outputting a voltage to the second secondary-side circuits in accordance with a voltage in the primary-side circuits.

Further, at least one of the plurality of converters may have an upper switch of the converter in continuous conduction operation.

Further, an input voltage of the corresponding converter may be bypassed and outputted when the upper switch is in continuous conduction operation.

Further, in the primary-side circuit, each output end of the plurality of cell strings may be connected in parallel via a switching element.

Further, the insulation type converter may comprise at least one of a flyback converter, a forward converter, and an LLC converter.

Further, the isolation type converter may perform primary side regulation (PSR) by referring to the output voltage of a secondary-side circuit having the same electric potential as the primary-side circuit.

Further, the plurality of converters may be connected in cascode.

To address the above technical subjects, there may be provided a power conversion device according to another exemplary embodiment of the present invention comprising: a plurality of converters, each connected to a plurality of cell strings, comprising at least one upper switch and at least one lower switch; and an auxiliary power supply unit to supply a drive power to each of the plurality of converters, the auxiliary power supply unit comprising: a first primary-side circuit receiving a voltage of an output end of at least one of the plurality of cell strings; and a second primary-side circuit receiving a voltage of an output end of at least one of the plurality of cell strings; a first isolation type converter outputting a voltage to the first secondary-side circuit in accordance with the voltage of the first primary-side circuit; a second isolation type converter outputting a voltage to the second secondary-type circuit in accordance with the voltage of the second primary-side circuit; and a plurality of first secondary-side circuits using the voltage outputted from the first isolation type converter to supply a drive power to each of the upper switches of the plurality of converters; and a plurality of second secondary-side circuits using the voltage outputted from the second isolation type converter to provide a drive power to each of the lower switches of the plurality of converters, wherein the plurality of converters has a multilevel structure.

Further, at least one of the plurality of converters may be outputted such that the input voltage of the relevant (corresponding) converter is bypassed when the upper switch of the converter is in continuous conduction operation.

Advantageous Effects

According to embodiments of the present invention, in using an MLPE having a multi-level structure, an auxiliary power supply circuit can be implemented to smoothly supply auxiliary power to the upper switch and lower switch of each DC/DC converter. Here, it is possible to generate multiple auxiliary power sources by applying a single or plurality of insulation type converters to the auxiliary power supply circuit, which is advantageous for reducing material costs. In addition, by using an MLPE with a multi-level structure, an auxiliary power source can be provided to the upper switch of each DC/DC converter, enabling the upper switch to be energized at 100% duty and further optimizing the operation in bypass mode.

BRIEF DESCRIPTION OF DRAWINGS

FIGS. 1 to 4 are block diagrams of a photovoltaic module according to a comparative embodiment of the present invention.

FIG. 5 is a drawing to illustrate a maximum power point tracking control.

FIG. 6 is a block diagram of a power conversion device according to one embodiment of the present invention.

FIGS. 7 to 12 are drawings to illustrate embodiments of the present invention.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention. In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

Modifications according to exemplary embodiments of the present invention may include some configurations of each embodiment together with some configurations of other embodiments. That is, a modification may include an embodiment of one of the various embodiments but omit some configurations and include some configurations of a corresponding other embodiment. Alternatively, it may be the other way round. The features, structures, effects, etc. described in the embodiments are included in at least one embodiment and are not necessarily limited to one embodiment. Furthermore, the features, structures, effects, etc. exemplified in each embodiment may be combined or modified in other embodiments by one having ordinary skill in the field to which the embodiments belong. Accordingly, contents related to such combinations and modifications should be construed as being within the scope of the embodiments.

FIG. 6 is a block diagram of a power conversion device according to one embodiment of the present invention, and FIGS. 7 to 12 are drawings to illustrate embodiments of the present invention.

A power conversion device (100) according to one embodiment of the present invention may comprise a plurality of converters (110) and an auxiliary power supply unit (120), and may comprise a plurality of cell strings (130), and a control unit (not shown).

Each converter of the plurality of converters (110) may include at least one upper switch and at least one lower switch, and each of the plurality of converters (110) may be connected to each of the plurality of cell strings.

Each of the plurality of cell strings (130) may include at least one cell, and when including a plurality of cells, the plurality of cells may be connected in series. The cell strings (130) may be solar cell strings comprising photovoltaic cells. The solar cell string may form a solar panel. The solar cells may be photovoltaic (PV), which uses the photoelectric effect to generate power. The photoelectric effect is the emission of electrons when light above a certain frequency strikes a certain metallic material, and power is generated by forming a PN junction using a P-type semiconductor and an N-type semiconductor, and generating a current using the electrons generated by the photoelectric effect. Photovoltaic cells are formed using silicon and other materials, and can be formed in the form of wafers. The photovoltaic cell is located in a field that can receive good sunlight, on the outer wall of a building, on a rooftop, or the like, and generates power using sunlight. In this case, the photovoltaic cell may be formed as a BIPV (building-integrated photovoltaic power generation) that is integrated with the building.

Because the amount of power generated by a single solar cell is insufficient for use by a load or the power grid, a plurality of solar cells, rather than a single solar cell, can be connected in series to form a solar cell string to generate power of a suitable size for use. A solar cell string may be the basic unit of power generation. A plurality of cell strings can be formed into a panel to form a solar panel. Photovoltaic cells have different voltage-current characteristics, and their maximum power point (MPP) fluctuates depending on sunlight, air temperature, and the like, as shown in FIG. 5.

(Power Generated=Voltage×Current) The power conversion device functions to control the solar cell to thereby operate at the maximum power point (MPP), which is the operating point at which the solar cell generates the maximum power under each condition. This is called maximum power point tracking (MPPT), and it can be used to increase the efficiency of solar power generation. Depending on the nature of the relationship between current and voltage in solar power generation and the relationship between voltage and power, the maximum power may not be the maximum voltage, but the power at about 80% of the maximum voltage. Since this maximum power point keeps changing depending on the magnitude of the voltage and current generated by the solar panel, it is necessary to keep looking for the point where the maximum power point can occur. In other words, in order to track the maximum power rather than the maximum voltage, the magnitude of the voltage and current can be varied so that the maximum power is achieved. That is, the voltage can be decreased and the current increased in the direction of increasing power, or the voltage can be increased and the current decreased.

The converter includes a plurality of converters (110) corresponding to the number of a plurality of cell strings (130). Each converter (110) is connected to a relevant (corresponding) cell string (130), receives power generated by the cell string (130), converts the voltage, and outputs it. As shown in FIG. 1, when all the cell strings are connected in series and the maximum power point tracking control is performed using a single converter, it is difficult to perform optimal maximum power point tracking when there is a difference in the amount of sunlight, etc. between the cell strings, so for efficient maximum power point tracking control, a plurality of converters connected to each of the plurality of cell strings are included to perform maximum power point tracking on a cell string basis.

The converter (110) is a DC-DC converter and can convert a signal having a first voltage to a signal having a second voltage and output it. Alternatively, a signal having a first current may be converted to a signal having a second current and output the same. In this case, the plurality of converters (110) may constitute a multilevel. The plurality of converters (110) may be connected in a cascode to form a multilevel. Here, the cascode means that the outputs are connected in multiple stages, and the outputs of the converters are stacked according to the cascode connection to form a multilevel. The multilevel means a structure in which the output signals of each converter are combined into a single signal and outputted. In this case, the (−) terminal of the output of the upper-level converter is sequentially connected to the (+) terminal of the output of the neighboring lower-level converter, and the outputs of the top-level converter and the outputs of the lowest-level converter are combined and output as one signal.

The control unit applies a control signal to each of the plurality of converters (110). The plurality of converters (110) receives the control signal and performs power conversion. At this time, maximum power point tracking control may be performed, or a bypass operation may be performed.

Each of the plurality of converters (110) receives a control signal from the control unit and performs maximum power point tracking so that the power of each connected cell string (130) is the maximum power. When a photovoltaic module formed by a plurality of cell strings is formed over a certain area, the maximum power point of the cell strings varies when the amount of sunlight is different between the cell strings, and each of the plurality of converters performs maximum power point tracking control for each cell string so that maximum power is generated in each cell string. This enables optimized maximum power point tracking control for each cell string.

The plurality of converters (110) may need to perform a bypass function whereby they output the voltage of the cell string as is, depending on the situation.

The bypass operation will be described in more detail later.

The auxiliary power supply unit (120) may provide a drive power to each of the plurality of converters (110). The plurality of converters (110) each may include at least one upper switch and at least one lower switch, and perform the power conversion by controlling the upper switch and the lower switch on and off. The upper and lower switches may be complementarily wired to each other. Each switch may be controlled by a time to remain turned on, i.e., a certain duty ratio. Here, the duty ratio refers to the on-in ratio within a certain period of time, also known as the time ratio.

Each switch may be a switching element that is operated by receiving a drive power, and an auxiliary power source is required to operate each switch. The switching element may be a semiconductor switching element, such as a FET or IGBT.

As shown in FIGS. 7 and 8, an auxiliary power source may be generated and provided to each converter. FIG. 7 may comprise an auxiliary power circuit that generates and supplies an auxiliary power source (V_AUX. X) relative to a reference potential of each converter. The auxiliary power source (V_AUX. X) for each converter may provide drive power to a gate driver for driving a FET, which is a switching element included in each converter.

As shown in FIG. 8, in the case of the lower switch (LOW-SIDE FET), the source terminal can be directly connected to the cathode of the auxiliary power supply (VAUX. X), so the auxiliary power supply can be directly used to drive the FET. However, since the source terminal of the upper switch (HIGH-SIDE FET) is not directly connected to the cathode of the auxiliary power supply and the gate driver cannot use the auxiliary power supply directly, a separate power supply (V_HS X) must be generated and used using a bootstrap circuit. In order for the bootstrap circuit to generate a voltage, the lower switch must be energized to form a charging path for the capacitor. Therefore, it is not possible to continuously energize (conduct) the upper switch without the operation of the lower switch, and it is necessary to intermittently energize the lower switch even for a short time to maintain the output voltage of the bootstrap.

As previously described, at least one converter of the plurality of converters (110) may require bypass operation to pass the voltage of a cell string straight through to the output side, depending on the situation. For example, if some of the cell strings of the plurality of cell strings (130) produce a lower voltage than other cell strings due to shading or the like, the voltage of the other cell strings may be bypassed directly to the output in order to reduce the voltage difference between each cell string to reduce losses and increase efficiency. In order to bypass the input voltage, the upper switch must be continuously energized (conducted) so that the input voltage is applied to the capacitor across which the output voltage is applied, i.e., the duty ratio of the upper switch must be maintained at 100%, but in the embodiments of FIGS. 7 and 8, there is a limit to which the upper switch cannot be continuously energized. Since the lower switch must be energized even for a short period of time, a problem may arise where the efficiency is reduced.

In order to keep the upper switch energized for bypass operation, the auxiliary power supply unit (120) may include a primary-side circuit that receives a voltage from an output end of at least one of the output ends of the plurality of cell strings, an insulation type converter that outputs a voltage to the first secondary-side circuit based on the voltage of the primary-side circuit, and a plurality of first secondary-side circuits that use the voltage outputted from the insulation type converter to supply a drive power to each of the upper switches of the plurality of converters.

As shown in FIGS. 9 to 12, the insulation type converter may be used to supply a separate drive power source to the upper switches of the plurality of converters from the lower switches, thereby energizing the upper switches at 100% duty ratio.

The description of a power conversion device according to an exemplary embodiment of the present invention is centered on a configuration of an auxiliary power supply unit generating an auxiliary power source for driving switches of the converters, and it is to be understood that the description of some configurations may be omitted, but may include configurations according to embodiments of the present invention. The plurality of converters (110) is each connected to a plurality of cell strings (130) in cascode to form a multilevel. The signals from the highest level to the lowest level outputted from the plurality of converters (110) are combined and outputted as a single signal.

The auxiliary power supply unit (120) may provide a drive power to each of the plurality of converters. Unlike FIGS. 3 and 4, where the cell strings, converters, control unit, and auxiliary power source all utilize the same ground, in case of a multi-level configuration, the auxiliary power source unit (120) must provide auxiliary power for each level.

For this purpose, the auxiliary power supply unit (120) may include an insulation type converter. A primary-side circuit of the insulation type converter is applied a voltage of at least one output end of the output ends of the plurality of cell strings, the insulation type converter outputs a voltage to a secondary-side circuit according to the voltage of the primary-side circuit, and the plurality of first secondary side circuits use the voltage outputted from the insulation type converter to supply a driving power to each of the upper switches of the plurality of converters.

The primary-side circuit may receive a voltage of at least one output of the plurality of cell strings, wherein the primary-side circuit may have each output of the plurality of cell strings connected in parallel via a switching element. Here, the switching element may be a diode as shown in FIG. 9. By connecting all of the outputs of each of the plurality of cell strings but through a diode, the highest of the cell string voltages may be selectively applied, i.e., even if some of the cell strings lack sunlight, the voltages of other cell strings that are generating sufficient power may be used to provide a drive power for all of the converters, whereby redundancy may be obtained. Alternatively, it is apparently possible to take the voltage of a particular cell string as an input and use it to provide auxiliary power without diodes.

The insulation type converter may include at least one of a flyback converter, a forward converter, and an LLC converter. The insulation type converter may perform a primary side regulation (PSR). The PSR may be performed with reference to an output voltage of a first secondary-type circuit having the same reference potential as the primary circuit. The output of the first secondary circuitry may be controlled by reference to a voltage reflected to the primary side via a transformer. The insulation type converter may also use a tertiary winding to control the first secondary circuitry output. The insulation type converter may also be controlled by reference to only a second secondary circuitry output voltage referenced to the same potential as the primary circuitry. For example, if the primary circuitry is referenced to ground, it may be controlled by reference to the first secondary circuitry output voltage referenced to ground.

To supply a drive power to the upper switch and drive power to the lower switch through the insulation type converter and first secondary-type circuit, an individual auxiliary power supply unit or the second secondary-type circuit may be included.

First, a plurality of individual auxiliary power supply units may be included to supply a drive power to each of the lower switches of the plurality of converters. As shown in FIG. 10, an individual auxiliary power supply unit may supply a drive power to the lower switches separately from the first secondary-side circuit. The individual auxiliary power supply unit may include a regulator connected between both ends of each input end of the plurality of converters, and the regulator may be connected between a lower gate driver supplying a gate signal to the lower switch and the (−) terminal of the input end. As shown in FIG. 10, individual auxiliary power supply unit may supply a drive power to the (−) terminal of the input end of each converter.

Each first secondary-side circuit supplying a drive power to the upper switch may be connected to an upper gate driver supplying a gate signal to the upper switch and to a terminal between the upper switch and the lower switch. As shown in FIG. 10, the driving power may be supplied based on the terminal between the upper switch and the lower switch.

An insulation type converter may be used to supply a drive power to each upper switch, and an individual regulator may be applied to supply a drive power to each lower switch.

Due to characteristics of MLPE, it can be operated in bypass mode a large percentage of the time, and the individual implementation of each auxiliary power source as described above enables an optimized auxiliary power supply for bypass mode, i.e., the insulation type converter can be used to continuously conduct the upper switch at 100% duty ratio. In addition, the power capacity of the individual regulator may be reduced by partially transferring the load of the individual regulator to the insulation type converter due to no application of bootstrap circuit, so that the individual auxiliary power source that is used less frequently in bypass mode can be configured at a lower material cost.

The individual auxiliary power supply unit may comprise a single regulator. The single regulator may include at least one of a linear regulator, a charge pump, a step-up converter, and a step-down converter. The single regulator may selectively use a linear regulator, a charge pump, a step-up (buck-boost) converter, or a boost converter. Implementation of the individual auxiliary power supply unit in a single regulator has the advantage of simplifying circuit construction.

Since the cell string voltage varies from time to time depending on the conditions of the solar cells, it should be applied appropriately according to the relationship between the range of variation of the string voltage and the target voltage (V_AUX) of the auxiliary power source. If the target voltage (V_AUX) of the auxiliary power source is lower than the lowest cell string voltage, a step-down is required, which can be achieved with a linear regulator or buck converter. If the target voltage (V_AUX) of the auxiliary power source is higher than the highest cell string voltage, a step-up is required, which can be achieved with a charge pump or boost converter. If only step-down or step-up is required, the circuit configuration is relatively simple and can be implemented at low material cost. However, if the target voltage (V_AUX) of the auxiliary power source is lower than the highest cell string voltage and higher than the lowest cell string voltage, a step-up/step-down voltage is required, and a non-inverting buck-boost converter should be used, in which the output voltage is not inverted to a negative voltage. The non-inverting buck-boost converter requires four semiconductor switches, resulting in a relatively complex circuit and high material cost.

In constructing an individual auxiliary power supply unit, two or more stages of a cascade-connected regulator may be used. The two or more stages of regulator may include at least two of a linear regulator, a charge pump, a step-up converter, and a step-down converter. Two stages of the same or different types of regulators may be used. In implementing a step-up/step-down voltage-capable auxiliary power supply circuit, a step-up regulator and a step-down regulator may be configured as a cascade. In this case, the circuit can be implemented regardless of the order of placement of the step-up and step-down regulators. In the two-stage regulator configuration, step-up/step-down type means that the auxiliary power supply voltage (V_AUX) can be stepped-up and stepped-down relative to the cell-string voltage.

At this time, the two or more stages of regulators may include a step-down regulator and a step-up regulator, as shown in FIG. 23. Here, the step-down regulator may include at least one of a linear regulator and a step-down converter, and the step-up regulator may include at least one of a charge pump and a step-up converter.

A combination of a linear regulator, a charge pump, a step-up converter, a step-down converter, and a boost converter can be used as a two-stage regulator, and a combination of a step-down regulator and a step-up regulator can be used to implement a step-up function with a two-stage regulator. As shown in FIG. 24, a linear regulator-charge pump combination, a linear regulator-boost converter combination, a buck converter-charge pump combination, and a buck converter-boost converter combination can be used to form the auxiliary power supply unit. Of these, combinations 1 to 3 can reduce material costs compared to a non-inverting type buck-boost converter.

Further, a plurality of second secondary-side circuits for supplying a drive power to each of the lower switches of the plurality of converters (110) may be included using a voltage outputted from the insulation type converter, and a voltage may be outputted to the second secondary-side circuit in accordance with a voltage in the primary side circuit.

The first secondary-side circuit and the second secondary-side circuit may include a first secondary-side circuit to provide auxiliary power to an upper switch included in each of the converters and a second secondary-side circuit to provide auxiliary power to a lower switch included in each of the converters, as shown in FIG. 11. The upper switch and the lower switch may each be provided with a separate drive power source.

The auxiliary power supply unit (120) may be a multi-output insulation type converter, wherein the multi-output insulation type converter may include a first output to supply auxiliary power to an upper switch included in each of the converters and a second output to supply auxiliary power to a lower switch included in each of the converters. Multiple output-capable insulation type converter may also be applied as a single regulator. With a multiple output-capable insulation type converter, each of the lower and upper switches included in the converter can be supplied with a drive power. Auxiliary power may also be generated by combining separate converters, linear regulators that take the output of a secondary circuit as their input.

A control unit may be included that monitors at least one of an input signal, an output signal of a plurality of converters, and a current flowing in an inductor included in each of the plurality of converters and transmits it externally via a power line communication (PLC), or generates and applies a control signal to each of the plurality of converters, and a third secondary-side circuit that supplies a drive power to the control unit may be included. In addition to the secondary circuitry corresponding to each converter, additional secondary circuitry for separate purposes may be used. In addition, auxiliary power may be provided to various modules that require power, such as drive power.

A power conversion device according to another embodiment of the present invention may comprise at least one upper switch and at least one lower switch, a plurality of converters each connected to a plurality of cell strings, and an auxiliary power supply unit providing a drive power to each of the plurality of converters.

A detailed description of the power conversion device according to another embodiment of the present invention corresponds to the detailed description of the power conversion device described with reference to FIGS. 1 to 11, and redundant descriptions will be omitted hereinafter.

An auxiliary power supply unit of a power conversion device according to another exemplary embodiment of the present invention may comprise: a first primary-side circuit receiving a voltage of at least one output end of the plurality of cell strings; a second primary-side circuit receiving a voltage of at least one output end of the plurality of cell strings; a first insulation type converter outputting a voltage to the first secondary-side circuit according to a voltage of the first primary-side circuit; and a second insulation type converter outputting a voltage to the second secondary-side circuit according to a voltage of the second primary-side circuit; a plurality of first secondary-side circuits for supplying a drive power to each of the upper switches of the plurality of converters using a voltage outputted from the first insulation type converter; and a plurality of second secondary-side circuits for supplying a drive power to each of the lower switches of the plurality of converters using a voltage outputted from the second insulation type converter, wherein the plurality of converters comprises a multilevel structure.

In providing the auxiliary power, a plurality of insulation type converters rather than a single insulation type converter may be used, i.e., by using a first insulation type converter for supplying a drive power to the upper switch and a second insulation type converter for supplying a drive power to the lower switch, the upper and lower switches that are complementarily conducted may be operated separately, thereby reducing power consumption. As shown in FIG. 12, a first primary-side circuit, a first insulation type converter, and a first secondary-type circuit may be used to supply a driving power to the upper switch of the converter, and a second primary-side circuit, a second insulation type converter, and a second secondary-type circuit may be used to supply a drive power to the lower switch of the converter.

The number of outputs and peak output power may be reduced compared to using a single insulation type converter for both the upper and lower switches, thereby facilitating converter design. In addition, due to the MLPE's characteristics of operating mostly in bypass mode, the auxiliary power supply unit for the lower switch, which is used less frequently, may be implemented with a single converter, thereby reducing material costs.

A photovoltaic module according to one embodiment of the present invention may comprise a plurality of cell strings (130), a plurality of converters (110), and an auxiliary power supply unit (120). The detailed description of the photovoltaic module according to an embodiment of the present invention corresponds to the detailed description of the power conversion device described with reference to FIGS. 1 to 12, and redundant descriptions will be omitted. By supplying an individual drive power to the upper switch of the converter, it is possible to continuously conduct the upper switch at 100% duty ratio, thereby further optimizing the operation in bypass mode, and the burden on the auxiliary power supply circuit for supplying a drive power to the lower switch may be reduced, thereby enabling a simpler, less frequently used auxiliary power supply circuit to be constructed with lower material costs.

One of ordinary skill in the art to which this disclosure relates will understand that variations may be implemented without departing from the essential features of the above-described subject matter. The disclosed methods are therefore to be considered from an illustrative rather than a limiting point of view. The scope of the invention is shown in the claims of the patent and not in the foregoing description, and all differences within the scope of equivalents are to be construed as included in the invention.

The invention claimed is:

1. A power conversion device comprising:
   a plurality of converters comprising at least one upper switch and at least one lower switch, and respectively connected to a plurality of cell strings; and
   an auxiliary power supply unit configured to supply driving power to each of the plurality of converters,
   wherein the auxiliary power supply unit comprises:
   a primary-side circuit receiving a voltage of at least one output terminal from among output terminals of the plurality of cell strings;

an insulation type converter configured to output a voltage to first secondary-side circuits in accordance with the voltage of the primary-side circuit; and
   the plurality of first secondary-side circuits configured to supply the driving power to each of the upper switch of the plurality of converters by using the voltage output from the insulation type converter, and
   wherein the plurality of converters constitutes a multi-level structure.

2. The power conversion device of claim 1, wherein each of the first secondary-side circuits is connected to an upper gate driver supplying a gate signal to the upper switch and to a terminal between the upper switch and the lower switch.

3. The power conversion device of claim 1, comprising a plurality of individual auxiliary power supplies configured to supply driving power to each of the lower switch of the plurality of converters.

4. The power conversion device of claim 3, wherein the individual auxiliary power supply unit comprises a regulator connected each between both input end of the plurality of converters, the regulator is connected between the (−) terminals of the input end and a lower gate driver supplying a gate signal to the lower switch.

5. The power conversion device of claim 1, comprising a plurality of second secondary-side circuits configured to supply driving power to each of the lower switches of the plurality of converters by using a voltage outputted from the insulation type converter, and
   wherein the insulation type converter outputs a voltage to the second secondary-side circuits in accordance with a voltage in the primary-side circuits.

6. The power conversion device of claim 1, wherein at least one of the plurality of converters has an upper switch of the relevant converter in continuous conduction operation.

7. The power conversion device of claim 6, wherein an input voltage of the relevant converter is bypassed and outputted when the upper switch is in continuous conduction operation.

8. The power conversion device of claim 1, wherein each output end of the plurality of cell strings is connected in parallel via a switching element in the primary-side circuit.

9. The power conversion device of claim 1, wherein the insulation type converter comprises at least one of a flyback converter, a forward converter, and an LLC converter.

10. The power conversion device of claim 1, wherein the insulation type converter performs primary side regulation (PSR) by referring to an output voltage of a secondary-side circuit having a same electric potential as the primary-side circuit.

11. The power conversion device of claim 1, wherein the plurality of converters is connected in cascode.

12. A power conversion device comprising:
   a plurality of converters comprising at least one upper switch and at least one lower switch, and respectively connected to a plurality of cell strings; and
   an auxiliary power supply unit configured to supply driving power to each of the plurality of converters,
   wherein the auxiliary power supply unit comprises:
   a first primary-side circuit receiving a voltage of at least one output terminal from among output terminals of the plurality of cell strings;
   a second primary-side circuit receiving a voltage of at least one output terminal from among output terminals of the plurality of cell strings;

a first insulation type converter configured to output a voltage to first secondary-side circuit in accordance with the voltage of the first primary-side circuit;

a second insulation type converter configured to output a voltage to second secondary-side circuit in accordance with the voltage of the second primary-side circuit;

the plurality of first secondary-side circuits configured to supply the driving power to each of the upper switch of the plurality of converters by using the voltage output from the first insulation type converter, the plurality of second secondary-side circuits configured to supply the driving power to each of the upper switch of the plurality of converters by using the voltage output from the second insulation type converter, and wherein the plurality of converters constitutes a multi-level structure.

13. The power conversion device of claim 12, wherein each of the first secondary-side circuits is connected to an upper gate driver supplying a gate signal to the upper switch and to a terminal between the upper switch and the lower switch.

14. The power conversion device of claim 12, comprising a plurality of individual auxiliary power supplies configured to supply driving power to each of the lower switch of the plurality of converters.

15. The power conversion device of claim 14, wherein the individual auxiliary power supply unit comprises a regulator connected each between both input end of the plurality of converters, the regulator is connected between the (−) terminals of the input end and a lower gate driver supplying a gate signal to the lower switch.

16. The power conversion device of claim 12, wherein at least one of the plurality of converters has an upper switch of the relevant converter in continuous conduction operation.

17. The power conversion device of claim 16, wherein an input voltage of the relevant converter is bypassed and outputted when the upper switch is in continuous conduction operation.

18. The power conversion device of claim 12, wherein each output end of the plurality of cell strings is connected in parallel via a switching element in the first primary-side circuit.

19. The power conversion device of claim 1, wherein the first insulation type converter comprises at least one of a flyback converter, a forward converter, and an LLC converter.

20. The power conversion device of claim 1, wherein the first insulation type converter performs primary side regulation (PSR) by referring to an output voltage of a first secondary-side circuit having a same electric potential as the first primary-side circuit.

\* \* \* \* \*